United States Patent
Hill et al.

(10) Patent No.: US 10,481,919 B2
(45) Date of Patent: Nov. 19, 2019

(54) AUTOMATIC OPTIMIZATION OF CONTINUOUS PROCESSES

(71) Applicant: Tibco Software Inc., Palo Alto, CA (US)

(72) Inventors: Thomas Hill, Tulsa, OK (US); Pawel Lewicki, Tulsa, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 188 days.

(21) Appl. No.: 14/665,292

(22) Filed: Mar. 23, 2015

(65) Prior Publication Data

US 2016/0283254 A1  Sep. 29, 2016

(51) Int. Cl.
  *G05B 19/418* (2006.01)
  *G06F 9/445* (2018.01)
  *G06Q 10/06* (2012.01)

(52) U.S. Cl.
  CPC ... *G06F 9/44505* (2013.01); *G05B 19/41865* (2013.01); *G06F 9/44552* (2013.01); *G06Q 10/06* (2013.01)

(58) Field of Classification Search
  CPC .. G06F 17/00; G06F 9/44505; G06F 9/44552; G05B 13/02; G05B 19/41865; G06Q 10/06
  USPC .................................................. 700/286, 28
  See application file for complete search history.

(56) References Cited

U.S. PATENT DOCUMENTS

| | | | |
|---|---|---|---|
| 7,389,151 B2 | 6/2008 | Badami et al. | |
| 2005/0216114 A1 | 9/2005 | Hsiung et al. | |
| 2007/0240648 A1 | 10/2007 | Badami et al. | |
| 2009/0125155 A1* | 5/2009 | Hill | G05B 13/048 700/286 |
| 2011/0276169 A1* | 11/2011 | Bourg, Jr. | G05B 19/41865 700/109 |
| 2014/0282227 A1* | 9/2014 | Nixon | G06F 17/5009 715/786 |

OTHER PUBLICATIONS

Lewicki, Pawel et al., Statistics: Methods and Applications, wordpress.com, Sep. 27, 2013 (accessed from <<https://i4iam.files.wordpress.com/2013/09/statistics-methods-and-applications.pdf>> on Feb. 13, 2018).*
Adali, T. et al., NOx and CO Prediction in Fossil Fuel Plants by Time Delay Neura Networks, vol. 6, Publisher: Integrated Computer-Aided Engineering, 1999, pp. 27-40.
Electric Power Research Institute (EPRI), Power Plant Optimization Industry Experience, 2005.

(Continued)

*Primary Examiner* — Michael J Huntley
(74) *Attorney, Agent, or Firm* — McGuireWoods LLP

(57) ABSTRACT

A system, method, and computer-readable medium are disclosed performing an optimization operation. The optimization operation optimizes continuous processes by identifying process states associated with specific ranges for a limited subset of control parameter inputs. In certain embodiments, the optimization operation states comprise clear, stable, and robust process states. Such an optimization operation provides a simpler and cost effective means to optimize continuous processes. Additionally, such an optimization operation is applicable more rapidly to a wider range of real-world operational issues as they occur regularly in continuous process scenarios.

21 Claims, 4 Drawing Sheets

(56) References Cited

OTHER PUBLICATIONS

Friedman, J., Multivariate adaptive regression splines (with discussion), vol. 19, No. 1, Publisher: Annals of Statistics, 1991, pp. 1-141.
Friedman, J. H., Greedy function approximation: A gradient boosting machine, Publisher: IMS 1999 Reitz Lecture, Feb. 24, 1999.
Loh, W.-Y, et al., Split selection methods for classification trees, vol. 7, Publisher: Statistica Sinica, 1997, pp. 815-840.
Internet Product Brochure, Model predictive control tool, Matrikon control performance optimizer, Solution for constrained multivariable control, Jun. 2009.
Si, F. et al., Optimization of coal-fired boiler SCRS based on modified support vector machine models and genetic algothrims, vol. 88, Publisher: FUEL, 2009, pp. 808-816.
Yohannes, Y. et al., Classification and Regression Trees: An Introduction: Technical Guide #3, Publisher: International Food Policy Research Institute, Published in: Washington, D.C., Mar. 1999.

\* cited by examiner

AUTOMATIC OPTIMIZATION OF CONTINUOUS PROCESSES

BACKGROUND OF THE INVENTION

Field of the Invention

The present invention relates to information handling systems. More specifically, embodiments of the invention relate to automatic optimization of continuous processes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to control continuously operating systems which execute continuous processes using information handling systems. An issue relating to this control is how to optimize underlying parameters driving a data stream in settings across various domains where data about the process are collected continuously. One example of a continuously operating system is a power plant such as a fossil fuel power plants where continuous process data describe the combustion process through multiple measurements such as temperatures and pressures, as well as the actionable parameters controlled by the operators that affect those measurements such as fuel and air flows. Other examples of continuously operating systems include applications of "Internet-of-Things" (IOT) technologies where large numbers of remote sensors collect data continuously to describe some process of interest, such as physiological processes in a patient, or the quality of automated manufacturing processes which are the result of input parameters (to the manufacturing process) also measured continuously (e.g., chemical manufacturing).

In many of these applications it is of interest to identify desirable or optimal states of the continuous process. For example, in a fossil fuel power plant, the optimal mixture of fuel and air to achieve minimal emissions and best heat rates over the entire load (power) range are of interest. In medical applications, the optimal dosages of drugs to achieve stable normal physiological functioning over the normal range of functions would be of interest. There are a number of specific challenges when summarizing and analyzing data (e.g., from measurements) collected to describe continuous processes. For example, measurements are often taken at different time intervals and at different step intervals. It can be difficult to align measurements of parameters for analyses and specifically, for predictive modeling of other process parameters and key process performance indicators measured upstream. Also for example, autocorrelations of parameter measurements can make it challenging to independently change individual process parameters. Continuous processes are often supervised, sometimes through closed-loop systems or via experienced operators, medical professionals, or engineers. However, the parameter values or settings themselves can be the result of specific processing conditions upstream of the process, creating strong autocorrelations in the process data. Also for example, competing complex goal functions can result in outcomes that are not independent of each other, but related to each other in complex ways, and related to upstream parameter settings in complex ways. However, application of known data modeling and predictive analysis methodology assumes clear identification of predictors (e.g., exogenous variables) of the system, and outcomes that depend on the predictors; in continuous processes, this distinction can usually not be made.

It is known to attempt to optimize high-dimensional continuous processes by building of prediction models from the data using some multivariate techniques such as neural nets or partial least squares methods, and then optimizing this process through inverse prediction (i.e., identifying the inputs expected to be associated with optimal performance according to the model). While neural networks based "point" optimization or time-series (time-delayed) neural networks optimization can somewhat successful in some domains, their implementation is often difficult, requiring carefully designed and expensive to maintain closed-loop systems.

SUMMARY OF THE INVENTION

A system, method, and computer-readable medium are disclosed for performing an optimization operation. The optimization operation optimizes continuous processes by identifying process states associated with specific ranges for a limited subset of control parameter inputs. In certain embodiments, the optimization operation states comprise clear, stable, and robust process states. Such an optimization operation provides a simpler and cost effective means to optimize continuous processes. Additionally, such an optimization operation is applicable more rapidly to a wider range of real-world operational issues as they occur regularly in continuous process scenarios.

The optimization operation addresses the problem of how to identify in a high-dimensional continuous stream of data repeatable stable states with desirable characteristics, to optimize the process that generates the data streams. The optimization operation specifies an analytic procedure and workflow (i.e., a recipe) that is effective for optimizing continuous processes.

More specifically, in certain embodiments, the optimization operation comprises some or all of the steps of extracting data describing the process, excluding data which obvious data errors, identifying an appropriate aggregation interval, defining a key performance indicator, applying a recursive partitioning operation to identify input parameter settings that are associated with a desirable process state, and determining final optimized parameter settings by relating results of application of the recursive partitioning operation back to historical data.

Additionally, in certain embodiments, the optimization operation further comprises identifying surrogate parameters and alternative recursive-partitioning models to identify a larger pool of combinations of possible parameter settings associated with an optimized process performance. Additionally, in certain embodiments, the optimization operation further includes identifying parameters that are proxy-measurements of other external parameters outside operator control. Additionally, in certain embodiments, realistic parameter ranges are identified as those for which there is actual evidence in the historical data that the parameter ranges produce an optimized result.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
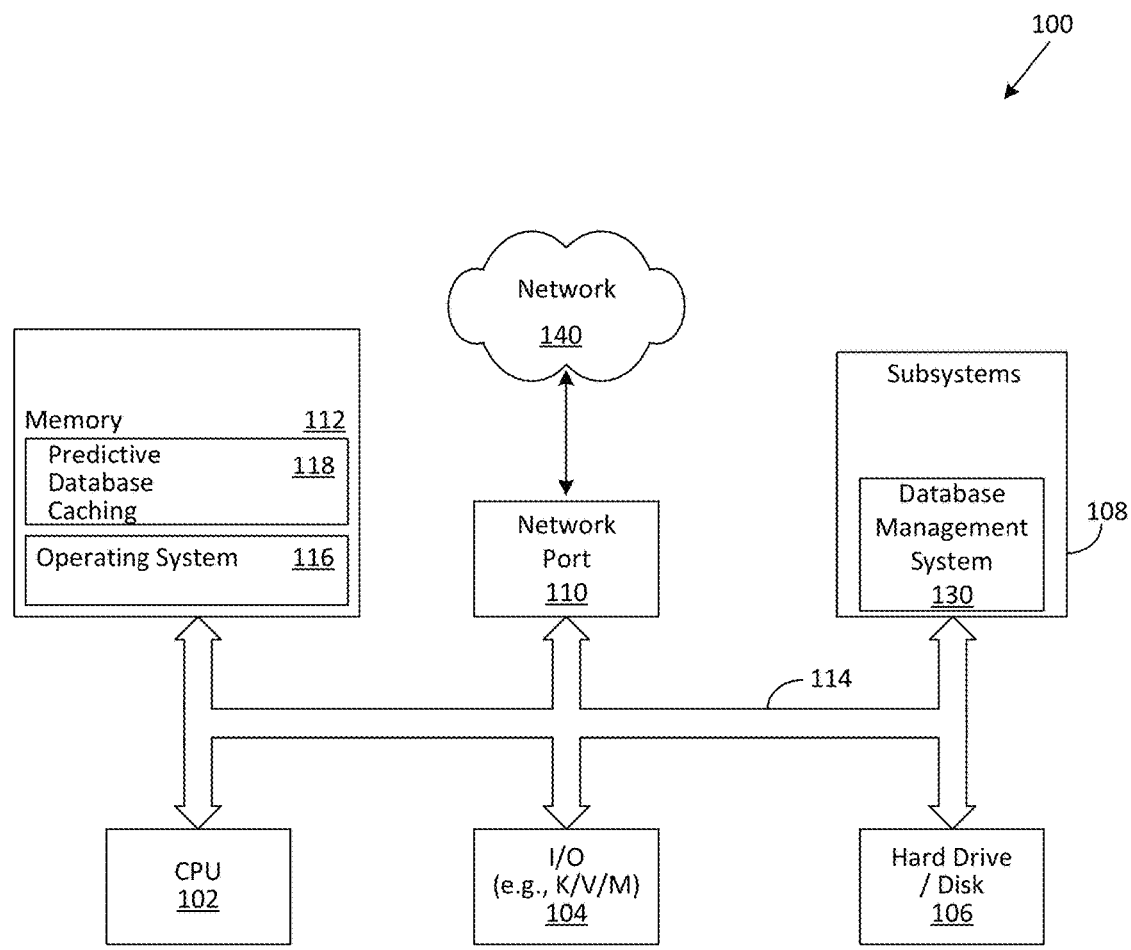
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an optimization module 118.

The optimization module 118 performs an optimization operation. The optimization operation optimizes continuous processes by identifying process states associated with specific ranges for a limited subset of control parameter inputs. In certain embodiments, the optimization operation states comprise clear, stable, and robust process states. Such an optimization operation provides a simpler and cost effective means to optimize continuous processes. Additionally, such an optimization operation is applicable more rapidly to a wider range of real-world operational issues as they occur regularly in continuous process scenarios. The optimization operation addresses the problem of how to identify in a high-dimensional continuous stream of data repeatable stable states with desirable characteristics, to optimize the process that generates the data streams. The optimization operation specifies an analytic procedure and workflow (i.e., a recipe) that is effective for optimizing continuous processes.

Figure 2:
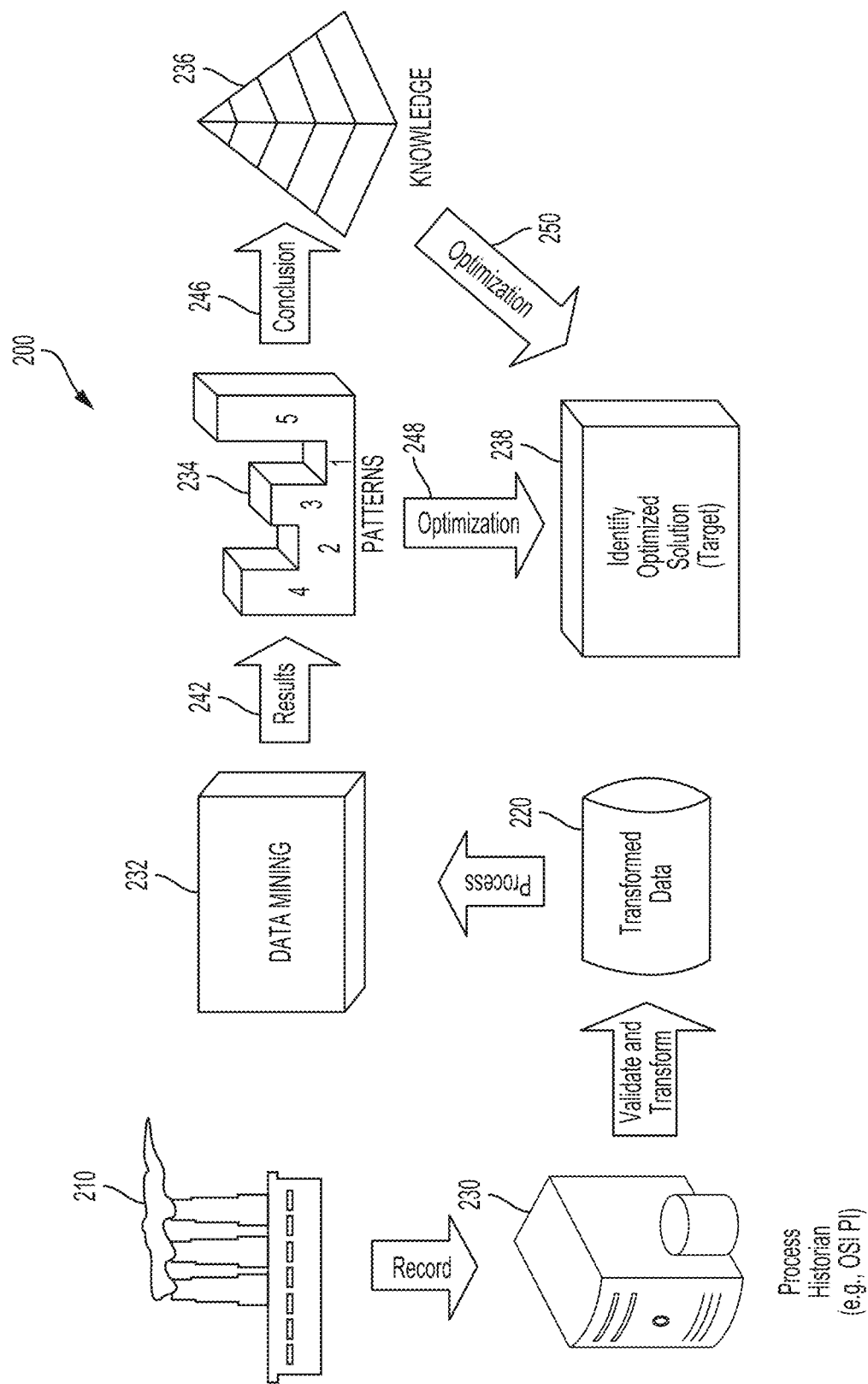
FIG. 2 shows a block diagram of an optimization for continuous processes environment.

FIG. 2 shows a block diagram of a continuous process optimization environment 200. More specifically, the continuous process optimization environment includes a continuously operating system which execute continuous processes 210 as well as a continuous process optimization system 220. The continuous process optimization system 220 includes a process historian 230, a data mining system 232, a pattern analysis system 234, a knowledge repository 236 and a solution identification system 238. The process historian 230 records data from the continuously operating system which executes continuous processes 210. The process historian 230 also validates and transforms the continuously recorded data and provides transformed data 240 to the data mining system 232. The data mining system 232 performs data mining operations on the transformed data and provides data mining results 242 to the pattern analysis system 234. The pattern analysis system 234 performs pattern analysis operations on the data mining results 242. The pattern analysis operations generate conclusions 246 (i.e., optimizations) which are provided to the knowledge repository 236 as well as proposed optimizations 248. The knowledge repository 236 analyzes the conclusions and provides optimizations 250 based upon the analysis. The solution identification system 238 uses the optimizations 248 and 250 to identify an optimized solution.

The data mining results comprise data associated with the continuously operating system. One operation performed by the pattern analysis system 242 is dividing parameters that are described by the data associated with the continuously operating system into outputs or outcomes, controllable inputs and uncontrollable inputs. The controllable inputs may be considered independent variables which can be manipulated. The uncontrollable inputs may be considered dependent variables which are only measured or registered.

Figure 3:
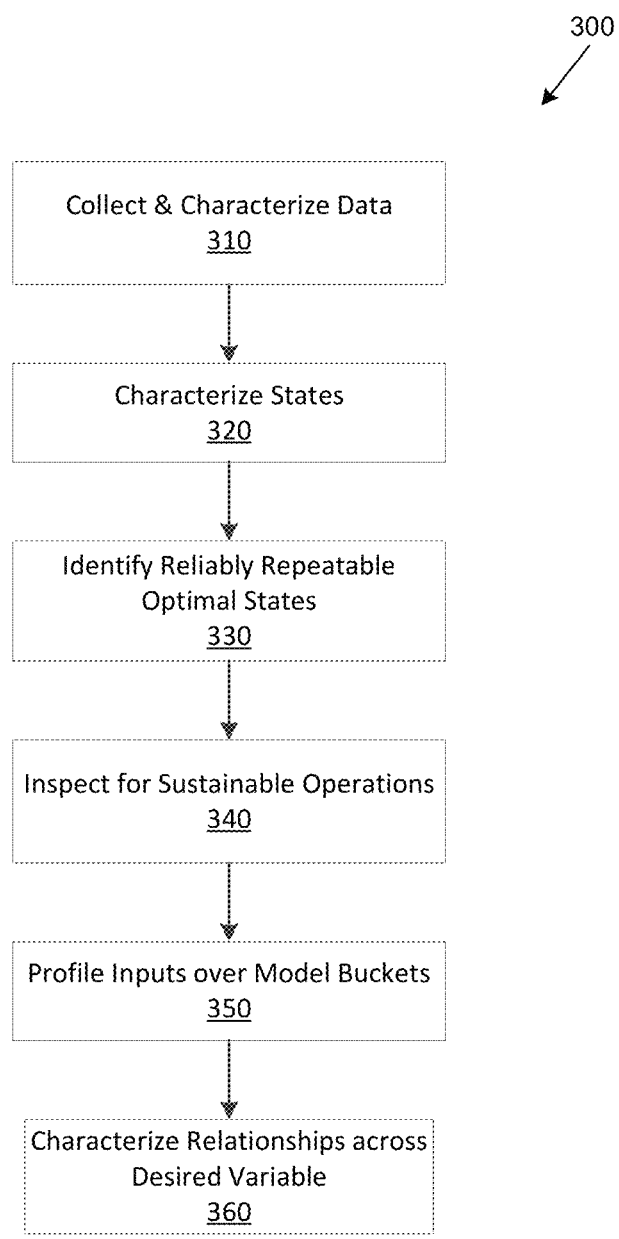
FIG. 3 shows a flow chart of the operation of an optimization for continuous processes system.

FIG. 3 shows a flow chart of an optimization for continuous processes operation 300. More specifically, in operation the optimization for continuous processes system 300 begins by collecting and characterizing data at step 310. In certain embodiments, the collecting data includes extracting data describing the process. Also, in certain embodiments, the characterizing further includes excluding data with obvious data errors. Next, at step 320 the optimization for continuous processes system 300 characterizes states within the optimization environment 200. In certain embodiments, the characterization of states includes identifying an appropriate aggregation interval. Next, at step 330 the optimization for continuous processes system 300 identifies reliably repeatable optimal states. In certain embodiments, the identification of reliably repeatable optimal states includes defining key performance indicators. Next, at step 340 the optimization for continuous processes system 300 inspects the identified states for repeatable operations. Next, at step 350 the optimization for continuous processes system 300 profiles the inputs of the environment 200 over a plurality of model buckets. In certain embodiments, the profiling of the inputs includes determining final optimized parameter settings by applying a recursive partitioning operation to identify input parameter settings that are associated with a desirable process state. Next, at step 360 the optimization for continuous processes system 300 characterizes relationships across a desired variable. In certain embodiments, the characterization of relationships includes determining final optimized parameter settings by relating results of application of the recursive partitioning operation back to historical data.

Additionally, in certain embodiments, the optimization operation further comprises identifying surrogate parameters and alternative recursive-partitioning models to identify a larger pool of combinations of possible parameter settings associated with an optimized process performance. Additionally, in certain embodiments, the optimization operation further includes identifying parameters that are proxy-measurements of other external parameters outside operator control. Additionally, in certain embodiments, realistic parameter ranges are identified as those for which there is actual evidence in the historical data that the parameter ranges produce an optimized result.

More specifically, the extracting data often includes extraction of all data describing the process. Typically, this extraction involves the extraction of a large amount of data (e.g., parameters and data points) from continuous process databases, to describe a representative (of the overall process, and the ranges of all measured parameters) time interval. Also, the identification of an appropriate aggregation interval identifies an aggregation interval for the continuous data (e.g., to 3-minute intervals, 6-minute measurement intervals, 24-hour intervals, etc.) that captures most of the unique variability occurring in the data, while avoiding unnecessarily short (e.g., second-by-second) measurement intervals where consecutive (adjacent) observations carry little additional informational value. This operation can be automated by identifying in the continuous data streams the aggregation interval (e.g., 2-minute, 6-minute, etc.) which yields an autocorrelation of aggregated values for consecutive time intervals that falls below a desirable autocorrelation threshold, typically between $r<0.8$ and $r<0.5$.

In certain embodiments, defining key performance indicators in the data includes definition of one or more key performance indicators (in the data) that are to be optimized (e.g., for fossil fuel combustion processes the measured NOx and CO emissions, flame temperatures, etc.; or physiological measurements such as heart rate, blood pressure, etc.)

In certain embodiments, application of one or more recursive partitioning operations along with cross validation methods to identify input parameter settings that are associated with desirable process states where all key performance indicators are optimal or near-optimal, or better-than average. Additionally, in certain embodiments, the application of the one or more recursive partitioning operations includes identification of surrogate parameters (e.g., surrogate splits) and alternative recursive-partitioning models, to achieve the largest possible pool of combinations of possible parameter settings associated with desirable (i.e., optimized) process performance. It is well known that complex optimization problems such as those described herein often have multiple optimal or near-optimal solutions. By generating the largest possible pool of combinations of possible parameter settings based on alternative recursive partitioning models multiple solutions are provided from which solutions can be selected that are easier to implement, compatible with existing control strategies and technologies, which cover a wide range of typical operational experiences with respect to the input parameters, and for which there is the support in the actual data, i.e., which are consistent with past operational experiences that have occurred. Additionally, in certain embodiments, the application of the one or more recursive partitioning operations includes identification of parameters that are proxy-measurements of other external parameters outside operator control. For example, in applications with coal burning furnaces for power generation, when the power generating equipment is operated over a wide load range, many of the parameters that are associated with key performance indicators (NOx and CO emissions) can be directly related to the power load under which the equipment is operated. Hence, to achieve a robust optimized solution (e.g., robust to load settings), it is important that the multitude of recursive partitioning solutions are applied to the values of such external uncontrollable parameters, to substantially eliminate optimized parameter solutions that cannot be achieved when those parameters (not under the control of the operator) vary widely (for example, by discarding solutions that have no or only very sparse coverage in the observed data for critical external uncontrollable parameters).

In certain embodiments, when determining final optimized parameter settings by relating results of application of the recursive partitioning operation back to historical data includes determination of final optimized parameter settings by relating the results of the application of the recursive partitioning algorithm back to the historical data, to determine optimized parameter ranges that are both realistic (e.g., which can be achieved), and for which there is evidence of the ranges having been achieved repeatedly in the historical data. More specifically, in certain embodiments, the application of recursive partitioning operations, it is important that realistic parameter ranges be identified as those for which there is actual evidence in the historical data (i.e., which actually exist in the historical data).

One example of a continuously operating system which executes continuous processes on which a continuous process optimization operation is performed is a power plant, such as a fossil fuel power plant.

Fossil fuel (e.g., coal) power plants use different boiler designs to burn efficiently, with minimum emissions. In particular, Nitrogen Oxide (NOx) and Carbon Monoxide (CO) emissions are important and thus become an important function of how the boiler is operated. There are multiple problems and limitations that can make boiler optimization very difficult. For example, in many power plants NOx and CO emissions are competing goal functions. I.e., when less oxygen is directed to a burner within the power plant, CO drops but NOx increases; when oxygen is increased, CO increases and NOx drops.

In addition, power plants typically include a plurality of important temperature limits that should be observed as hot air is directed through a convection pass of the power plant to the heat exchangers of the power plants that generate the steam. Other limitations pertain to oven wall temperatures as well as sustainability of the process over time: It is not unusual for a boiler within the power plant to run seemingly well, only to collect enough residue (essentially molten rock) throughout the furnace and convection pass to build up undesirable slag. When that happens, the system has to be shut down and very expensive maintenance has to be applied.

To address all of these issues, in coal-burning power plants expensive environmental systems are often deployed. For example, Urea-Injection systems are often used for NOx control; over-fired air systems are often used for CO control. Particulate emissions are often controlled via bag-houses. Accordingly, a continuous process optimization system 220 enables a continuously operating power plant to be advantageously optimized.

More specifically, in a power plant example, the continuous process optimization system 220 provides and approach and recipe to address the aforementioned issues relating to power plants. In the power plant example, one goal of the continuous process optimization system 220 is to minimize NOx and CO over the normal operational range, while maintaining sustainable robust operations in the presence of normally occurring variability in fuel quality and other non-controllable parameters.

First, the continuous process optimization system 220 collects substantially all the data associated with the power plant and divides the parameters that are described by the data into outputs or outcomes (e.g., NOx, CO; flame temperatures, electricity/power output), controllable inputs (e.g., air flows, damper positions, fuel flows) and uncontrollable inputs (e.g., fuel quality, electricity demand, ambient temperatures, season-of-the year).

When processing the data, the continuous process optimization system 220 also identifies here specific constraints for all of these variables; for example, the temperatures in the convection pass (at the heat-exchangers) cannot exceed a certain temperatures.

Next, the continuous process optimization system 220 performs clustering or applies other similar methods to certain uncontrollable operational parameter inputs (e.g., electricity demand). One goal of this operation is to divide an overall range of operations into as many repeated steady (or transitional) states as possible. Thus, the continuous process optimization system 220 performs model operations to optimize states rather continuous processes.

Next, the continuous process optimization system 220 performs a binary tree operation to identify groups of operational data where both small NOx and CO emissions occurred. In certain embodiments, the binary tree operation corresponds to a classification and regression tree (CART) operation. In other embodiments, other recursive partitioning operations can also be used, but on important goal of any recursive partitioning operation is to identify groups of actual and repeatable data where optimal operations were observed with the minimum variability in all critical outputs. One aspect of the CART and other recursive partitioning operation that is advantageous is that the CART operation includes a node purity function. The node purity function identifies groups of actual and repeatable data where optimal operations were observed with the minimum variability in all critical outputs. After completing the binary tree operation, many (e.g., thousands) of empirically validated operations states are identified for different power loads, over a substantially normal range of operations.

Figure 4:
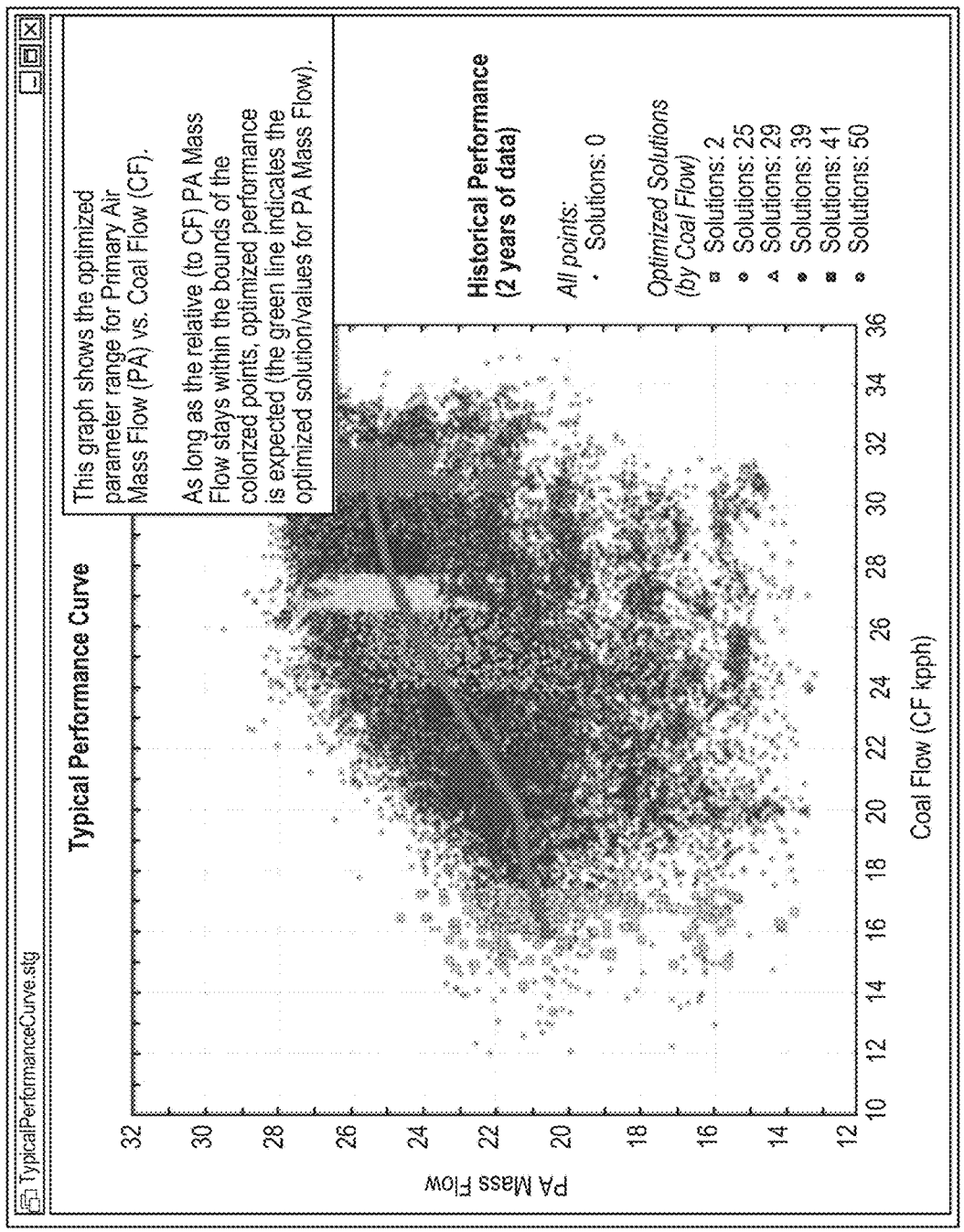
FIG. 4 shows an example screen presentation of a typical performance optimization graph.

Next, the continuous process optimization system 220 scores the observed data with identifies (IDs) that uniquely identify the optimal performance groups identified in the previous step. The data are then plotted on scatterplots against time, labeled and color-coded by these IDs. (FIG. 4 shows an example of one such scatterplot.) By plotting the observed data, the continuous process optimization system ensures that the optimal states are sustainable and robust. The plot enables identification of those optimal model groups that occurred over the longest period of time, and with the greatest repeated frequency over time, i.e. for which there is the greatest actual evidence in the observed historical data. The plot also enables the continuous process optimization system to identify sets of consecutive data points spanning the greatest time period associated with an optimal model ID.

Next, the continuous process optimization system 220 selects one of the optimal model identifiers where optimal performance has occurred. Such optimal performance occurred multiple times across the historical performance record of the power plant. Also, the historical performance record of the power plant is reviewed to assure that such optimal performance did not precede any below-average performance or malfunctions.

Next, the continuous process optimization system 220 performs an optimal model verification operation. The optimal model verification operation executes profiles (i.e., descriptive statistics) of all inputs (including both controllable inputs and uncontrollable inputs) over the optimal model identifier observed in the previous step. The execution of the profiles allows the continuous process optimization system to identify the characteristics of states that are robust and repeatable, across all input parameters. Specifically, the optimal model verification operation verifies that the entire range of uncontrollable input parameters is captured by the model groups. In this step, the continuous process optimization system 220 may discard certain model groups that clearly identify only specific optimal solutions associated with certain uncontrollable input events (better fuel; a specific date or time where one or more input events were different).

Next, the continuous process optimization operation graphs or otherwise characterizes the relationships between controllable inputs across power demand, for the data in optimal buckets and those not in the optimal buckets. What emerges are "performance curves" which describe how controllable parameters should be set at certain operational states, and how those settings are different from non-optimal performance. Such curves are then provided to control systems as function generators for controlling the power plant.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an optimization operation on continuous processes generated from a plurality of system sensors, comprising:
    transforming a continuous stream of data comprising process states associated with specific ranges of a subset of control parameter inputs, wherein transforming comprises:
        dividing the control parameter inputs into outputs, controllable inputs, and uncontrollable inputs; and
        identifying constraints for the outputs, controllable inputs, and uncontrollable inputs;
    performing a clustering operation on select uncontrollable inputs, wherein the clustering operation includes dividing the ranges into a plurality of reliable repeatable process states;
    identifying reliably repeatable optimal states from the reliable repeatable process states, the identifying the -reliably repeatable optimal states comprising defining a key performance indicator as a continuous process output by applying a recursive-partitioning operation to identify input parameter settings that are associated with a desirable process state, the recursive-partitioning operation comprising identifying surrogate parameters and alternative recursive-partitioning models to obtain a pool of combinations of possible parameter settings associated with an optimized process performance;
    characterizing relationships among the control parameter inputs for the reliably repeatable optimal states and for non-optimal states; and
    determining operational states for the control parameter inputs based on the characterized relationships;
    wherein the operational states describe controllable parameters and settings to control the system.

2. The method of claim 1, wherein:
    the subset of control parameter inputs comprises optimization operation states, the optimization operation states comprising clear, stable, and robust process states.

3. The method of claim 1, further comprising:
    extracting the data comprising the process states.

4. The method of claim 3, further comprising:
    excluding data with data errors from the data comprising the process states; and
    identifying an aggregation interval for the extracting.

5. The method of claim 1, further comprising dividing the control parameter inputs into independent variables and dependent variables, wherein the independent variables comprise controllable inputs.

6. The method of claim 1, wherein the reliably repeatable optimal states are identified using scatterplots.

7. The method of claim 6, wherein the scatterplots identify multiple observed optimal states and models in data identified through clustering and recursive-partitioning modeling.

8. The method of claim 7, further comprising performing an optimal model verification operation, wherein profiles of all inputs are executed over the optimal states and models.

9. The method of claim 7, further comprising the step of translation of multiple models into performance curves for control systems.

10. The method of claim 1, further comprising discarding an optimal state associated with an uncontrollable input from the uncontrolled inputs.

11. The method of claim 1, further comprising:
    determining final optimized parameter settings by relating results of application of the recursive partitioning operation back to historical data.

12. A system for performing an optimization operation on continuous processes generated from a plurality of system sensors, the system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
    transforming a continuous stream of data comprising process states associated with specific ranges of a subset of control parameter inputs, wherein transforming comprises:
        dividing the control parameter inputs into outputs, controllable inputs, and uncontrollable inputs; and
        identifying constraints for the outputs, controllable inputs, and uncontrollable inputs;
    performing a clustering operation on select uncontrollable inputs, wherein the clustering operation includes dividing the ranges into a plurality of reliable repeatable process states;
    identifying reliably repeatable optimal states from the reliable repeatable process states, the identifying the -reliably repeatable optimal states comprising defining a key performance indicator as a continuous process output by applying a recursive-partitioning operation to identify input parameter settings that are associated with a desirable process state, the recursive-partitioning operation comprising identifying surrogate parameters and alternative recursive-partitioning models to obtain a pool of combinations of possible parameter settings associated with an optimized process performance;
    characterizing relationships among the control parameter inputs for the reliably repeatable optimal states and for non-optimal states; and
    determining operational states for the control parameter inputs based on the characterized relationships;
    wherein the operational states describe controllable parameters and settings to control the system.

13. The system of claim 12, wherein:
    the subset of control parameter inputs comprises optimization operation states, the optimization operation states comprising clear, stable, and robust process states.

14. The system of claim 12, wherein the computer program code further comprises instructions executable by the processor for:
    extracting the data comprising the process states.

15. The system of claim 12, wherein the computer program code further comprises instructions executable by the processor for:
    excluding data with data errors from the data comprising the process states; and
    identifying an aggregation interval for the extracting.

16. The system of claim 12, wherein the computer program code further comprises instructions executable by the processor for:
    determining final optimized parameter settings by relating results of application of the recursive partitioning operation back to historical data.

17. A non-transitory, computer-readable storage medium embodying computer program code, the computer program code comprising computer executable instructions configured for:
    transforming a continuous stream of data comprising process states associated with specific ranges of a subset of control parameter inputs, wherein transforming comprises:
        dividing the control parameter inputs into outputs, controllable inputs, and uncontrollable inputs; and
        identifying constraints for the outputs, controllable inputs, and uncontrollable inputs;
    performing a clustering operation on select uncontrollable inputs, wherein the clustering operation includes dividing the ranges into a plurality of reliable repeatable process states;
    identifying reliably repeatable optimal states from the reliable repeatable process states, the identifying the -reliably repeatable optimal states comprising defining a key performance indicator as a continuous process output by applying a recursive-partitioning operation to identify input parameter settings that are associated with a desirable process state, the recursive-partitioning operation comprising identifying surrogate parameters and alternative recursive-partitioning models to obtain a pool of combinations of possible parameter settings associated with an optimized process performance;
    characterizing relationships among the control parameter inputs for the reliably repeatable optimal states and for non-optimal states; and
    determining operational states for the control parameter inputs based on the characterized relationships;
    wherein the operational states describe controllable parameters and settings to control the system.

18. The non-transitory, computer-readable storage medium of claim 17, wherein:
    the subset of control parameter inputs comprises optimization operation states, the optimization operation states comprising clear, stable, and robust process states.

19. The non-transitory, computer-readable storage medium of claim 17, wherein the computer program code further comprises computer executable instructions for:
    extracting the data comprising the process states.

20. The non-transitory, computer-readable storage medium of claim 17, wherein the computer program code further comprises computer executable instructions for:
    excluding data with data errors from the data comprising the process states; and
    identifying an aggregation interval for the extracting.

21. The non-transitory, computer-readable storage medium of claim 17, wherein the computer program code further comprises computer executable instructions for:
    determining final optimized parameter settings by relating results of application of the recursive partitioning operation back to historical data.

* * * * *